April 29, 1952     J. B. O'CONNOR     2,595,095
FASTENER
Filed Feb. 7, 1945
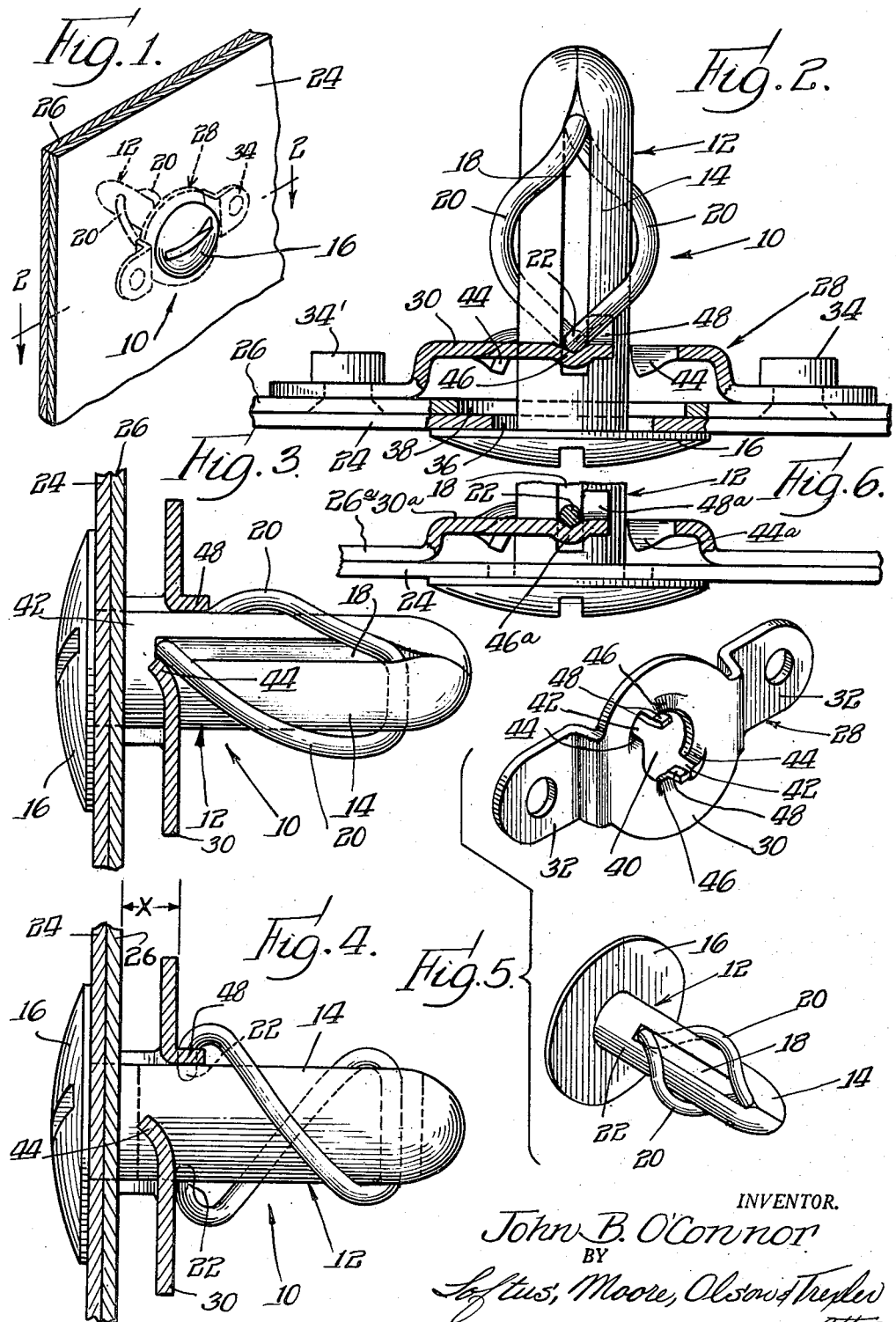
INVENTOR.
John B. O'Connor Patented Apr. 29, 1952

2,595,095

UNITED STATES PATENT OFFICE 2,595,095

FASTENER

John B. O'Connor, Evanston, Ill., assignor to Illinois Tool Works, Chicago, Ill., a corporation of Illinois Application February 7, 1945, Serial No. 576,606

15 Claims. (Cl. 24—221)

This invention relates generally to rotary fastener devices and more particularly to fastener devices employing a fastener stud member which need only be partially rotated for quickly attaching or detaching work pieces.

Quickly operable fasteners of the general type contemplated by the present invention have heretofore been commonly referred to as cowl fasteners because they have been used extensively for detachably securing cowling parts of aeroplanes and the like. The use of cowl fasteners, because of the relative high cost of manufacture, has been limited to fields such, for example, as the field of aircraft construction. In such fields the increased cost of fastener devices is not a disturbing economic factor. There is, however, a large field in which fasteners of the type contemplated hereby can be used providing the cost factor is held to a reasonable minimum. It is, therefore, an important object of the present invention to provide a fastener device for firmly securing work pieces together, which is quickly operable and which may be produced at extremely low cost without sacrificing durability and fastening efficiency.

One of the factors which has heretofore rendered the cost of cowl fastener manufacture relatively high has been the use of special sheet metal stampings designed to cooperate with a rigid lug of a rotary stud. The present invention proposes the elimination of such higher costs by providing a novel and inexpensive resilient feature of construction in the stud.

More specifically, the present invention contemplates a fastener device incorporating a rotary fastening stud equipped with novel resilient work latching arms adapted to yieldably clamp work pieces together as the stud is rotatably inserted through registering apertures in said pieces.

Still more specifically, the present invention contemplates a fastener of the type referred to above, wherein the stud arms comprise a wire structure capable of firmly and resiliently exerting a strong clamping force and which will yield in response to the rotation of the stud within the work.

It is a further object of the present invention to provide a quickly operable fastener which is particularly adaptable to be used in instances where the lateral lug or arm of a rotary stud must be tightened against a relatively rigid work surface.

Yet another object of the present invention is to provide in a fastener device of the type previously referred to, resilient stud arms preformed into a helix to facilitate entrance within the work and having the free extremities thereof shiftable laterally to facilitate insertion within the aperture of a work piece.

The foregoing and other objects and advantages will be more apparent from the following detailed description when considered in connection with the accompanying drawing wherein:

Figure 1 is a perspective view showing a fastener of the present invention applied to a pair of sheet metal work pieces;

Figure 2 is an enlarged view taken along the line 2—2 of Figure 1, showing the manner in which the novel resilient stud arms act to resiliently clamp the two work pieces together, a portion of the sheet metal stamping being broken away to more clearly illustrate the manner in which the stud arms cooperate therewith;

Figure 3 is a view similar to Figure 2 illustrating the position occupied by the resilient stud arms as the stud is initially inserted;

Figure 4 is a view similar to Figure 3 disclosing the position occupied by the stud arms as the stud is further rotated toward its locked position;

Figure 5 is an exploded perspective view showing the stud and metal stamping; and Figure 6 is a partial view similar to Figure 2 disclosing the manner in which the work piece may be preformed so as to lockingly engage the resilient stud arms, thereby dispensing with the use of a separate stamping.

Referring now to the drawing, wherein like numerals have been employed to designate similar parts throughout the various figures, it will be seen that the present invention contemplates a quickly operable fastener device designated generally by the numeral 10. This fastener device includes a rotary stud member designated generally by the numeral 12. The stud member 12 includes a shank 14 and a head 16 formed at one extremity thereof. Particular attention is directed to a length of wire crimped in position within a longitudinal slot 18 in the stud member 12 so as to provide a pair of opposite helically disposed resilient arms 20.

It will be noted that the intermediate portion of the wire which provides the arms 20 is crimped or otherwise secured within the slot 18, as illustrated in Figure 2. From this point the wire is helically bent so as to encircle the stud periphery, as illustrated. The free extremities 22 of the arms 20 are bent inwardly and are accommodated by the longitudinal slot 18. Attention is also directed to the fact that as the arms 20 extend helically toward the head 16, they also diverge from a position adjacent the stud periphery at the point of attachment, to a spaced relation from the stud periphery in the vicinity of the free extremity. This is best illustrated in Figure 4, where it will be observed that the free extremities of the helical portions of the arms are spaced from the stud periphery. The reason for this construction will be more apparent as the description progresses. The extremities of the arms 20 lodged within the slot 18, as illustrated in Figure 4, preferably overlap each other so as to permit lateral movement of the arms.

In Figures 1 to 4, inclusive, the rotary fastener or stud 12 is shown in operative association with two work pieces, one an outer or detachable work piece 24 and the other an inner or fixed work piece 26. Also in the embodiment disclosed in Figures 1 to 4, inclusive, use is made of a fastener part or stamping designated generally by the numeral 28. This stamping 28 includes a central plate 30 supported between and spaced outwardly from the plane of attaching portions 32. These portions 32 are secured to the inner work piece 26, as by means of rivets 34, 34'. This stamping 28, although made from sheet material, is preferably rigid in construction. That is to say, the resiliency is embodied in the stud arms 20 rather than in the plate 30 of the stamping.

The work pieces 24—26 are provided with registering apertures 36 and 38 (Figure 2). The aperture 36 is slightly smaller than the distance measured across the free extremities of the arms 20, namely the distance indicated by the letter X in Figure 4. As the stud is inserted through the aperture 36 the arms 20 are flexed inwardly a sufficient distance to permit the passage of the stud structure, and after the arms have cleared the aperture 36 they automatically spring outwardly to their normal position as illustrated in Figure 4. Thus once the stud has been telescopically associated with the outer work or cowling part 24, it is secured against inadvertent detachment from the cowling part or work piece 24. Cowling parts are usually equipped with a plurality or series of studs arranged in spaced relation and the above described simple arrangement for securing the stud against detachment is of considerable practical significance.

As the cowling part or work piece 24 is moved into association with the fixed plate 26 the shank passes through the aperture 38 and then into a central aperture 40 in the plate 30. The diameter of the aperture 40 is just sufficient to accommodate the stud 12, and radial recesses 42, communicating with the aperture 40, are designed to accommodate the resilient wires or arms 20. As the stud arms 20 pass through the radial recesses 42, rotation is imparted to the stud and eventually the free extremities 22 of each arm engage a cam surface 44 (Figure 3). The arm extremities 22 must move axially of the stud, being guided by the longitudinal slot 18. This flexing of the stud arms 20 causes the plates 24 and 26 to be firmly clamped together. Continued rotation of the stud carries the arm extremities 22 to the position shown in Figures 2 and 4. In this position each extremity engages a depression or indentation 46 and is prevented from further rotation in a counterclockwise direction, as viewed from the top of Figure 2, by an abutment 48. Thus the elongated helically disposed arms 20 function to securely hold the cowling parts together.

In Figure 6 the separate stamping stud receptacle 28 has been eliminated and the work piece 26a has been preformed to provide a section 30a which is spaced from the plane of the work piece 26a. This section 30a is functionally identical with the plate 30 previously described. It will be noted that the section 20a is provided with a cam portion 44a and an abutment 48a to prevent overrunning of the resilient arms. A detent 46a cooperates with the free extremities 22 of the arms 20 to prevent inadvertent retrograde rotation.

By having the center plates 30—30a spaced from the plane of the inner work sheet 26, 26a, sufficient clearance is provided so as to permit partial withdrawal of the stud before the outer work sheet 24 is removed from the sheet 26, 26a. In instances where a single stud member is used to secure two work pieces together the spacing of the center portion 30—30a from the plane of the inner work sheet 26, 26a is not essential, because under such instances the outer work piece may be moved away from the inner work sheet 26, 26a immediately upon registration of the free extremities of the stud arms 20 with the radial recesses 42. In instances where a plurality of studs are used on the outer work part 24 it is essential that all of the studs be at least partially withdrawn upon registration of the free extremities 22 with the radial recesses 42. In this manner the separation of the outer work sheet as a unit from the inner work sheet or plate is materially facilitated. By reason of the flexibility of the stud arms 20 a stud of a given size is adapted to be used with work sheets of various thicknesses. Unlike conventional cowl fastener studs equipped with rigid lugs carried by the stud shank which are adapted to be used only on work parts of a given thickness, and stud of the present invention, because of its resilient stud arm construction may be used with work sheets of different thicknesses. Obviously the distance between the abutment surface provided by the underside of the head 16 and the free extremities of the arms 20 is normally less than the overall thickness of the work for which the stud is designed to be used. In the disclosed embodiment the lateral abutment or clamping surface provided by the stud head is located at one extremity of the shank. It is contemplated that the lateral work engaging abutment may be located at any point along the shank adjacent the free extremities of the stud arms.

From the foregoing it will be apparent that the present invention contemplates a fastener device of extremely simple and practical construction. No expensive special stud receptacle is required inasmuch as the stud incorporates resilient locking members or arms. By constructing these arms of a length of wire, a very simple yet practical resilient stud structure is provided. Also, by having the arms flare outwardly from the stud periphery, the automatic locking or retention of the stud within the outer sheet is accomplished by simply pressing the stud through the aperture in said piece. While the recesses in the shank for accommodating the in-turned extremities of the resilient latching arms are illustrated as extending in substantial parallelism of the stud axis, it will be observed that in instances where desired, the recesses may extend in a direction to accommodate the type of arm employed and the type of work pieces which are to be secured together.

While certain details of construction have been disclosed herein for the purpose of illustrating a practical embodiment of the invention, it will be understood that said invention is not limited to such details of construction but is capable of other modifications and changes without departing from the spirit and scope of the appended claims.

The invention is hereby claimed as follows:

1. A quickly operable fastener device including a rotary stud member having a shank portion, a lateral work engaging abutment spaced from one end of said shank portion, an elongated work latching arm helically disposed around the shank of the stud member and having one extremity mounted on the shank, the opposite portion of said arm extending toward said abutment and having an in-turned axially shiftable extremity, said in-turned extremity terminating in position for slidably engaging a work surface interposed between said extremity and said abutment to yieldably resist lateral displacement axially of the stud as an incident to stud rotation.

2. A quickly operable fastener device including a rotary stud member having a shank portion, lateral work engaging abutment means spaced from one end of said shank portion, oppositely disposed elongated work latching arms helically disposed around the shank of the stud member and having one extremity mounted on the shank, the opposite portions of said arms extending toward said abutment and each having an in-turned axially shiftable extremity, said in-turned extremities terminating in position for slidably engaging a work surface interposed between said extremities and said abutment to yieldably resist lateral displacement axially of the stud as an incident to stud rotation.

3. A quickly operable fastener device including a rotary stud member having a shank portion, a lateral work engaging abutment spaced from one end of said shank portion, an elongated work latching arm helically disposed around the shank of the stud member and having one extremity mounted on the shank, the opposite portion of said arm extending toward said abutment and having an in-turned extremity, said in-turned extremity terminating in position for slidably engaging a work surface interposed between said extremity and said abutment to yieldably resist lateral displacement axially of the stud as an incident to stud rotation, the distance between said in-turned extremity of said arm and said abutment being normally less than the overall thickness of the work for which the fastener is intended to be used.

4. A quickly operable fastener device including a rotary stud member having a shank portion, a lateral work engaging abutment associated with said shank portion, and oppositely disposed resilient work latching arms helically disposed around the shank of the stud member, one extremity of each arm being mounted on the shank portion, the opposite portions extending toward said abutment and having in-turned axially shiftable extremities terminating in position for slidably engaging a work clamping surface interposed between said latching arm and lateral abutment to yieldably resist lateral deflection axially of the shank portion as an incident to stud rotation, said shank portion having oppositely disposed recesses for accommodating said in-turned extremities of the arms.

5. A quickly attachable and detachable fastener for clamping opposed surfaces of a work structure of a given thickness including a rotary stud member having a shank portion, a lateral abutment spaced from one end of said shank for clampingly engaging one of said work surfaces, an elongated work latching arm of firm resilient material having one extremity mounted on the shank, the opposite extremity of said arm being free and extending toward said abutment, said free extremity being inturned and having a portion terminating externally of the shank periphery and when in normal unclamped position spaced from said lateral abutment a distance less than the thickness of said work structure so that when said stud is subjected to rotation said free extremity of the arm will yieldably coact with said lateral abutment to clamp said work surfaces therebetween, and said arm when in clamped position having a curvature defined by its resiliency in opposition to forces applied at its opposite ends.

6. A quickly attachable and detachable fastener for clamping opposed surfaces of a work structure of a given thickness including a rotary stud member having a shank portion, a lateral abutment spaced from one end of said shank for clampingly engaging one of said work surfaces, a pair of oppositely disposed elongated work latching arms of firm resilient material, one extremity of each of said arms being mounted on the shank and the opposite extremity being free and extending toward said abutment, said free extremities being inturned and having portions terminating externally of the shank periphery and when in normal unclamped position spaced from said lateral abutment a distance less than the thickness of said work structure so that when said stud is subjected to rotation said free extremities of the arms will yieldably coact with said lateral abutment to clamp said work surfaces therebetween, and said arms when in clamped position having a curvature defined by their resiliency in opposition to forces applied at their opposite ends.

7. In combination with an apertured work structure having oppositely disposed surfaces adapted to be clampingly engaged, a quickly attachable and detachable fastener for clamping said opposed work surfaces including a rotary stud member having a shank portion, a lateral abutment spaced from one end of said shank for clampingly engaging one of said work surfaces, an elongated work latching arm of firm resilient material having one extremity mounted on the shank, the opposite extremity of said arm being free and extending toward said abutment, said free extremity being inturned and having a portion terminating externally of the shank periphery and when in normal unclamped position spaced from said lateral abutment a distance less than the thickness of said work structure in the vicinity of said aperture so that when said stud is subjected to rotation said free extremity of the arm will yieldably coact with said lateral abutment to clamp said work surfaces therebetween, and said arm when in clamped position having a curvature defined by its resiliency in opposition to forces applied at its opposite ends.

8. A quickly attachable and detachable fastener for clamping opposed surfaces of a work structure of a given thickness, as set forth in claim 7, wherein means is provided adjacent the work aperture for interlocking with the free extremity of the latching arm to prevent inadvertent retrograde rotation of the stud.

9. A quickly attachable and detachable fastener for clamping opposed surfaces of a work structure of a given thickness, as set forth in claim 7, wherein an abutment is provided adjacent the work aperture adapted to be engaged by the latching arm for limiting the extent of rotation of the stud in a tightening direction.

10. A fastener as defined in claim 5, wherein the stud shank portion is provided with a recess receiving the inturned free extremity of the arm, said recess providing a guide for the arm free end as the arm is flexed into clamped position.

11. A fastener as defined in claim 6, wherein said pair of latching arms is formed as a yoke member, the bight portion of which extends through an opening in the stud member to effect the mounting of said one extremity of each of the arms on the stud shank.

12. A fastener as defined in claim 6, wherein the stud shank portion is provided with recesses receiving the inturned ends of the free extremities of the arms, said recesses providing guiding surfaces for guiding the free extremities of the arms as the arms are moved into clamped position.

13. A quickly attachable and detachable fastener for clamping opposed surfaces of a work structure of a given thickness, as set forth in claim 7, wherein means is provided adjacent the work aperture defining a slot through which the latching arm may be projected and from which the free extremity of the arm is withdrawn as the arm is moved into clamped position.

14. A quickly attachable and detachable fastener for clamping opposed surfaces of a work structure of a given thickness, as set forth in claim 7, wherein means is provided adjacent the work aperture defining a cam riser surface engageable with the free extremity of the arm upon stud rotation after insertion of the stud into the work aperture, to effect the movement of the latching arm into clamped position.

15. An article of sale comprising a stud provided with a transverse aperture and at the outer end with means for rotating the stud; and a resilient stiff hard elastic wire having a yoke part in said aperture and two arms emerging from opposite ends of the aperture and extending at least partly around the stud and toward the outer end, the ends of said arms being inwardly turned toward the stud body, and the stud body having recesses receiving said arm ends.

JOHN B. O'CONNOR.

REFERENCES CITED

The following references are of record in the file of this patent:

UNITED STATES PATENTS

| Number | Name | Date |
| --- | --- | --- |
| 2,110,435 | Albin | Mar. 8, 1938 |
| 2,262,418 | Zahodiakin | Nov. 11, 1941 |
| 2,340,250 | Murphy | Jan. 25, 1946 |